Sept. 25, 1923.
A. ZISKA, JR
1,469,136
SEAT
Filed Sept. 20, 1919   2 Sheets-Sheet 1
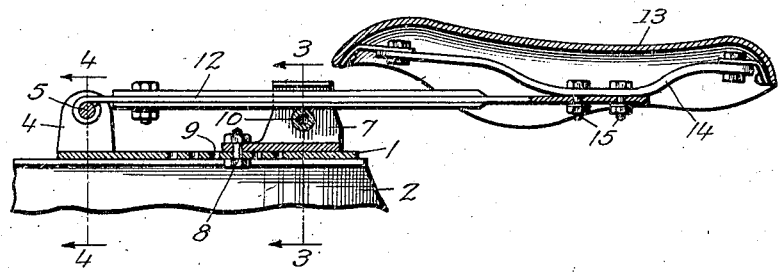
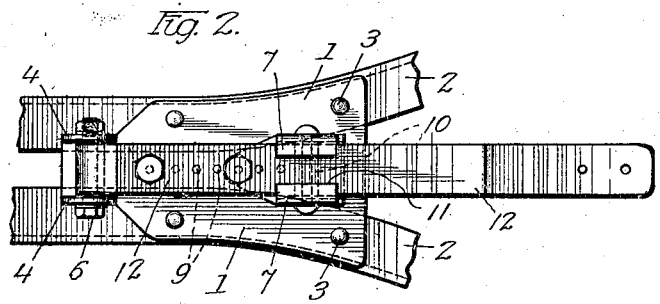
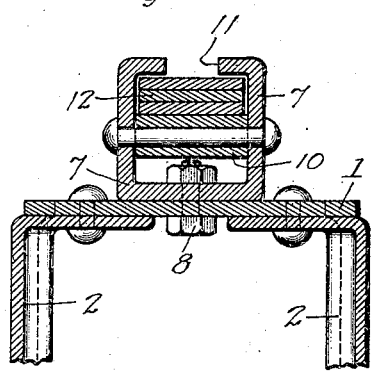
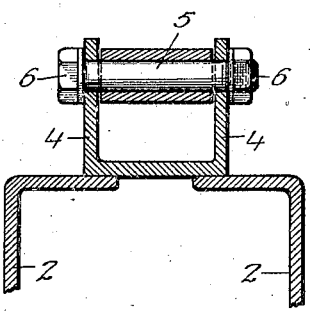
Inventor
Adam Ziska Jr
Edwin B. H. Tower Jr  Atty.

Sept. 25, 1923.
A. ZISKA, JR
SEAT
Filed Sept. 20, 1919
1,469,136
2 Sheets-Sheet 2
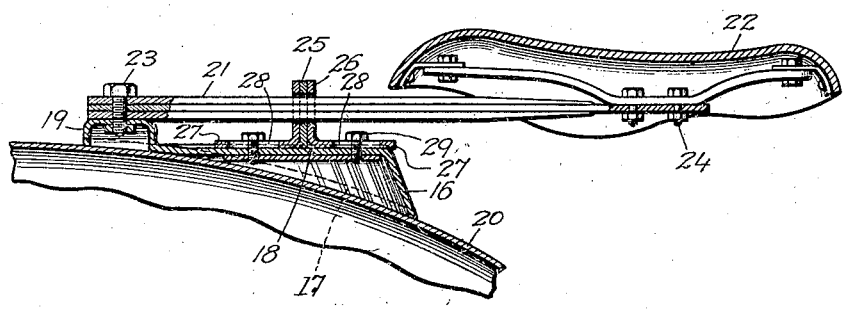
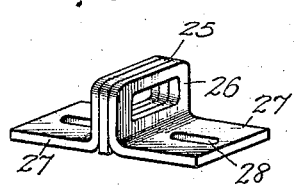
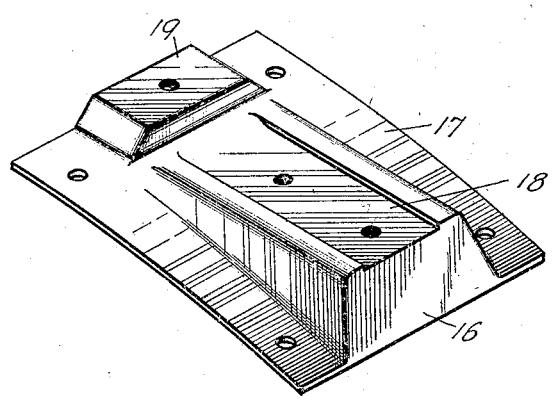
Inventor
Adam Ziska Jr.
Edwin B. H. Tower Jr.
Atty.

Patented Sept. 25, 1923.

1,469,136

UNITED STATES PATENT OFFICE.

ADAM ZISKA, JR., OF MILWAUKEE, WISCONSIN, ASSIGNOR TO HARLEY-DAVIDSON MOTOR CO., OF MILWAUKEE, WISCONSIN, A CORPORATION OF WISCONSIN.

SEAT.

Application filed September 20, 1919. Serial No. 325,212.

*To all whom it may concern:*

Be it known that I, ADAM ZISKA, Jr., a citizen of the United States, residing at Milwaukee, in the county of Milwaukee and State of Wisconsin, have invented new and useful Improvements in Seats, of which the following is a specification.

This invention relates to a seat.

One of the objects of this invention is to provide a spring seat which is adapted for cycles.

A further object is to provide a spring seat which may be economically manufactured.

A further object is to provide a seat and support therefor which co-operates with the frame members of a cycle to brace the parts.

A further object is to provide a spring seat in which the tension of the spring may be readily adjusted.

A further object is to provide a simple, rugged and durable seat.

Other objects will appear.

An embodiment of the invention is shown in the accompanying drawings.

The views of the drawings are:

Fig. 1 is a longitudinal vertical section through the spring seat and support.

Fig. 2 is a plan of the seat support.

Fig. 3 is a section on line 3—3 of Fig. 1.

Fig. 4 is a section on line 4—4 of Fig. 1.

Fig. 5 shows a modified form of a seat spring support.

Fig. 6 is a perspective of the base.

Fig. 7 is a perspective of the spring support.

Figs. 1 to 4 will first be described. A plate 1 is secured to the two upper members 2—2 of a motor-cycle frame being riveted thereto at 3, and acts as a brace therefor and also as a base for the seat. At its forward end it is provided with upstanding ears 4 through which a bolt 5 is passed and held in position by means of nuts 6—6. A spring support 7 is adjustably secured to the base 1 by means of a bolt 8 which passes through one of a series of openings 9 in the base member 1 and through an opening in the bottom portion of the spring support 7. The spring support 7 carries a freely mounted roller 10, and has the upper ends of its side portions bent inwardly to form retaining, or guiding ears 11. A leaf spring 12 is pivotally secured to the ears 4 by having the end of its central member bent around the bolt 5. The leaf spring passes rearwardly over the base 1 and is supported upon the roller 10. A seat 13 is secured to the free end of the spring 12 by having its frame 14 bolted thereto by means of a plurality of bolts 15.

Figs. 5, 6, and 7 will now be described. A base 16 is stamped from sheet metal so as to form curved flanges 17, a horizontal guide-way 18 and a raised forward portion 19. The curved flanges 17 fit the curved portion of the two upper members 20 of the motor-cycle frame and are bolted thereto, thereby securely positioning the base and providing a bracing member for these frame members 20. A leaf spring 21 is secured to the raised portion 19 by means of a bolt 23, and extends rearwardly over the base member 16. A seat 22 is secured at the free end of this leaf spring by having its frame bolted to the central member thereof by means of a plurality of bolts 24. At an intermediate point of this leaf spring, an eyeleted support is provided, which comprises a central member 25 and two outer members 26 which have their lower ends oppositely bent so as to form horizontal portions 27 which slide within the guide-way 18. The support may be clamped in any position along the guide-way 18 by means of slots 28, in the member 27, and a pair of bolts 29 passing therethrough and threaded into the base member 16.

When it is desired to adjust the tension of the spring, in either of the two forms shown, the spring support is moved towards the front end of the base, to decrease the stiffness, and rearwardly to increase the stiffness, and is thereafter bolted in its adjusted position. Although a guide-way for the spring support has been shown in only one of the constructions it could be provided in either.

The parts which form the major portion of this seat may be readily stamped from flat material and, therefore, may be economically manufactured.

Obviously other structures may be devised which will embody the invention herein set forth.

I claim:

1. A seat comprising a substantially horizontal base plate formed from a single sheet of stamped metal, a saddle, a resilient member secured at one end directly to said base plate and at its other end to said saddle, and a support for said resilient member intermediate the ends thereof carried by said base plate.

2. A seat for cycles comprising a base stamped to provide attaching flanges conforming to the shape of the upper portion of the cycle frame and to provide a horizontal guide-way and a raised forward portion, a leaf spring attached to the raised forward portion and extending rearwardly over said base and spaced therefrom, a support adjustably mounted within said horizontal guide-way and forming a bearing for an intermediate portion of said spring, and a saddle attached to the free end of said spring.

3. A seat for cycles comprising a base plate stamped from sheet metal and conforming to the shape of the upper portion of the cycle frame and having an integral projection at the forward end, a leaf spring secured at one end to said projection, a saddle attached to the opposite end of said spring, and an intermediate adjustable support forming a bearing member for said spring.

4. A seat for cycles comprising a base plate directly carried by the cycle frame members, a leaf spring secured to said base plate at one end and extending rearwardly over said base plate, a saddle attached to said leaf spring at its free end, and a member arranged to slide upon said base plate and support said leaf spring at a point intermediate its ends.

5. An adjustable spring supported seat comprising a base having a projection at the forward end, a leaf spring secured to said projection and extending over said base, a saddle carried adjacent the free end of said spring, a guide-way formed in said base, a support for said leaf spring intermediate the ends of said spring comprising a member having an opening through which said spring loosely passes and a lower portion arranged to slide in said guideway, and means for clamping said support.

6. In combination with a cycle having a pair of juxtaposed upper frame members, a brace joining said members and having a raised portion at its forward end, a leaf spring fastened to said raised portion and extending rearwardly over said brace, a saddle carried by the free end of said leaf spring, and a member arranged to support said spring at a point intermediate its ends and adjustably secured to said brace.

7. A seat comprising a substantially horizontal plate having an integral raised forward portion, a leaf spring fastened to said raised portion and extending rearwardly over said plate, a saddle carried at its free end, and a support adjustably mounted upon said plate against which the leaf spring bears.

8. A seat having in combination a base plate formed from a single sheet of metal and provided with a pair of supporting members carried entirely thereby, a saddle, a resilient member having one end connected to one supporting member and the other end fastened to the saddle, the resilient member lying in a substantially horizontal plane and being supported intermediate the ends thereof by the other supporting member.

9. A seat having in combination a saddle, a plate conforming to the shape of the upper portion of the cycle frame, a pair of spaced supporting members connected to the plate, and a leaf spring supported in a substantial horizontal plane by said supporting members, one end of the leaf spring being connected to the saddle and the other to one of the supporting members and intermediate its ends engaging the second supporting member.

In witness whereof, I have hereunto subscribed my name.

ADAM ZISKA, Jr.